(12) United States Patent
Tran et al.

(10) Patent No.: US 8,279,091 B1
(45) Date of Patent: Oct. 2, 2012

(54) RFID SYSTEM FOR GESTURE RECOGNITION, INFORMATION CODING, AND PROCESSING

(75) Inventors: Nghia Tran, San Diego, CA (US);
Sunny Fugate, Albequerque, NM (US);
Jeffrey Ellen, San Diego, CA (US);
Lorraine Duffy, San Diego, CA (US);
Hoa Phan, Escondido, CA (US)

(73) Assignee: The United States of America as Represented by the Secretary of the Navy, Washington, DC (US)

( * ) Notice: Subject to any disclaimer, the term of this patent is extended or adjusted under 35 U.S.C. 154(b) by 415 days.

(21) Appl. No.: 12/611,861

(22) Filed: Nov. 3, 2009

(51) Int. Cl.
*H03M 11/00* (2006.01)

(52) U.S. Cl. ......... 341/20; 341/21; 341/34; 340/539.22; 340/539.23; 340/4.1; 340/4.11; 340/686.1

(58) Field of Classification Search ............. 340/539.26, 340/539.22, 539.11; 341/20–34
See application file for complete search history.

(56) References Cited

U.S. PATENT DOCUMENTS

| | | | | |
|---|---|---|---|---|
| 6,861,945 B2 * | 3/2005 | Kim et al. | ................. | 340/407.1 |
| 7,034,685 B2 * | 4/2006 | Fabre et al. | ................. | 340/572.1 |
| 7,242,293 B2 * | 7/2007 | Rea et al. | ................. | 340/539.11 |
| 7,769,510 B2 * | 8/2010 | Denholm et al. | ............ | 701/29.6 |
| 8,125,440 B2 * | 2/2012 | Guyot-Sionnest et al. | ... | 345/156 |
| 2005/0148339 A1 * | 7/2005 | Boman et al. | .............. | 455/456.1 |
| 2006/0273894 A1 * | 12/2006 | Goehler | .................... | 340/539.13 |
| 2008/0284571 A1 * | 11/2008 | Wilbrink et al. | ............ | 340/10.1 |
| 2009/0054077 A1 * | 2/2009 | Gauthier et al. | ........... | 455/456.1 |
| 2009/0212979 A1 * | 8/2009 | Catchings et al. | .............. | 341/20 |
| 2010/0097195 A1 * | 4/2010 | Majoros et al. | ............. | 340/10.6 |
| 2011/0006894 A1 * | 1/2011 | Witwer et al. | ........... | 340/539.11 |

\* cited by examiner

*Primary Examiner* — Albert Wong
*Assistant Examiner* — Peter Mehravar
(74) *Attorney, Agent, or Firm* — Ryan J. Friedl; Kyle Eppele (57) ABSTRACT

A system includes a controller and an RFID sensor, an RFID sensor reader having a detection region, and a transceiver connected to the controller. The system may be secured to or contained within a wearable glove. The RFID sensor is configured to transmit an RFID sensor signal to the RFID sensor reader when the RFID sensor is within the detection region. The RFID sensor reader is configured to transmit an RFID sensor reader signal to the controller after receiving the RFID sensor signal. The controller is configured to transmit a signal to the transceiver after receiving the RFID sensor reader signal. The signal may include input from a motion sensor and/or an orientation sensor connected to the controller. The transceiver may transmit the signal to a remote processor via an antenna. The signal may be used for gesture recognition, information coding, and/or information processing.

6 Claims, 7 Drawing Sheets

RFID SYSTEM FOR GESTURE RECOGNITION, INFORMATION CODING, AND PROCESSING

FEDERALLY SPONSORED RESEARCH AND DEVELOPMENT

The RFID System for Gesture Recognition, Information Coding, and Processing is assigned to the United States Government and is available for licensing for commercial purposes. Licensing and technical inquiries may be directed to the Office of Research and Technical Applications, Space and Naval Warfare Systems Center, Pacific, Code 2112, San Diego, Calif., 92152; voice (619) 553-2778; email ssc_pac_T2@navy.mil. Reference Navy Case No. 99864.

BACKGROUND

Certain scenarios require the use of non-verbal communication. Examples of traditional methods of non-verbal communication include hand signals and Morse code. However, traditional non-verbal communication methods limit the number of recipients that can receive the communication and limit the type of information that can be transmitted. A need exists for a non-verbal communication system that overcomes the aforementioned drawbacks.

DETAILED DESCRIPTION OF SOME EMBODIMENTS

Figure 1:
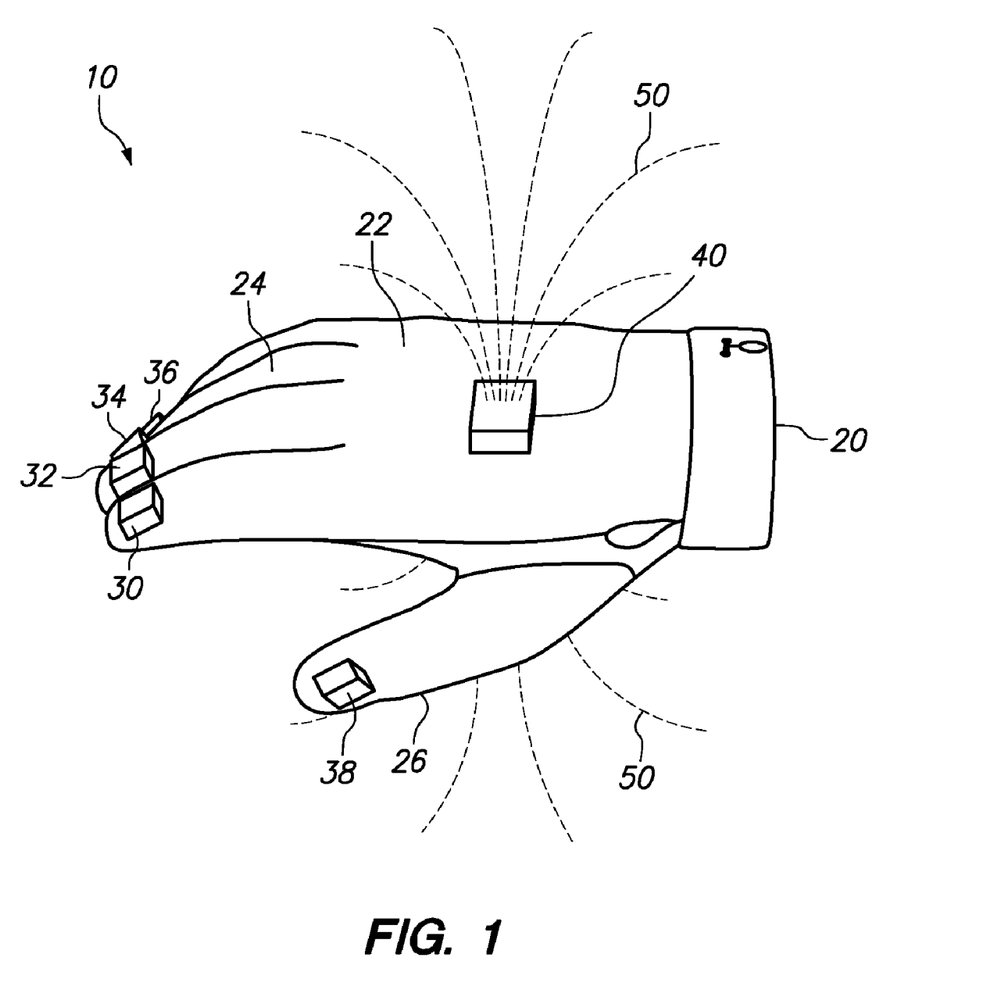
FIG. 1 shows a diagram of a wearable glove RFID system in accordance with the RFID System for Gesture Recognition, Information Coding, and Processing.

FIG. 1 shows a diagram of a wearable glove RFID system 10 in accordance with the RFID System for Gesture Recognition, Information Coding, and Processing. System 10 involves a hand-mounted system wherein finger position may be determined with respect to the hand, and hand position may be determined with respect to the body or other objects. System 10, as well as the other systems described herein, provides relative positional output that may be interpreted by consumer or end-user software as information including, but not limited to: gestures with semantic interpretation for human-to-human communication, gestures with semantic interpretation for human-to-computer communication (i.e. human/computer interface or input device), and gestures with no semantic interpretation serving as instrumentation of the wearer (i.e. reporting relative physical position).

System 20 may include a wearable glove 20, including a palm portion 22, a plurality of finger portions 24, and a thumb portion 26, RFID sensors 30, 32, 34, and 36 coupled to wearable glove 20 near the tip of each finger portion 24, RFID sensor 38 coupled to glove 20 near the tip of thumb portion 26, and an RFID sensor unit 40 coupled to glove 20 on the back of palm portion 22. RFID sensor unit 40 includes an RFID sensor reader (see FIG. 2) that has a detection region defined by electromagnetic lines 50. RFID sensors 30, 32, 34, 36, and 38 are wirelessly connected to a controller contained within RFID sensor unit 40. In operation, a user makes gestures by causing RFID sensors 30, 32, 34, 36, and/or 38 to enter into or remain out of the detection region. Examples of gestures are shown in FIGS. 3 and 4.

Wearable glove RFID system 10 eliminates mechanical moving parts and complex wirings that make it difficult to miniaturize glove-based devices. Further, system 10 requires much less maintenance and calibration effort than optical, accelerometer, or other known gesture recognition methods. System 10 eliminates many of the requirements for statistical or algorithmic methods used in gesture recognition systems. Using a system such as system 10, any object or tool can be easily instrumented as an RFID glove device by attaching a small and inexpensive RFID tag, as further discussed herein with respect to FIG. 8.

A benefit to system 10 is the ability to extend the system without dramatically increasing the computational overhead for recognizing and using the system. Adding an individual RFID tag to the system increases the expressive power of the system, but does not increase its computational cost. By use of an RFID sensor within system 10, as opposed to alternative sensing mechanisms, new sensors may be added to system 10 at runtime or during use. Other designs, especially any that are wired or require positional calibration, require the number and configuration of sensors to be fixed very early in the design process. Further, additional RFID sensors increase expressiveness, but require no alterations to the RFID reader or any hardware.

Figure 2:
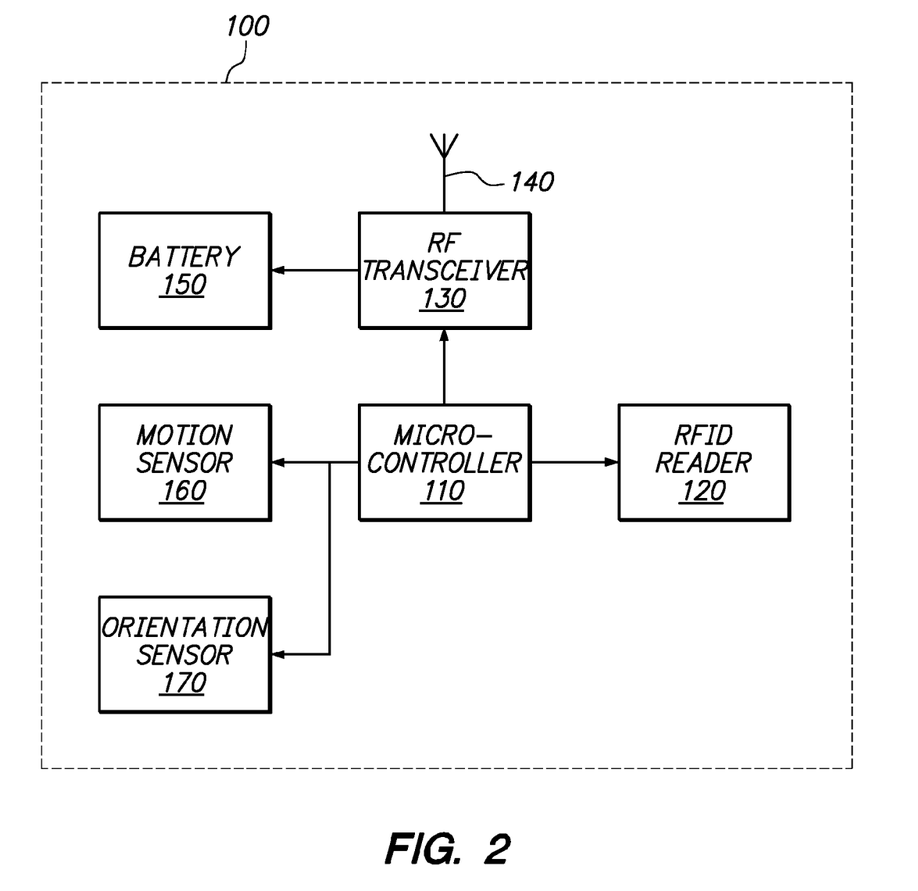
FIG. 2 shows a block diagram of an embodiment of an RFID sensor unit in accordance with the RFID System for Gesture Recognition, Information Coding, and Processing.
Figures 3A, 3C:
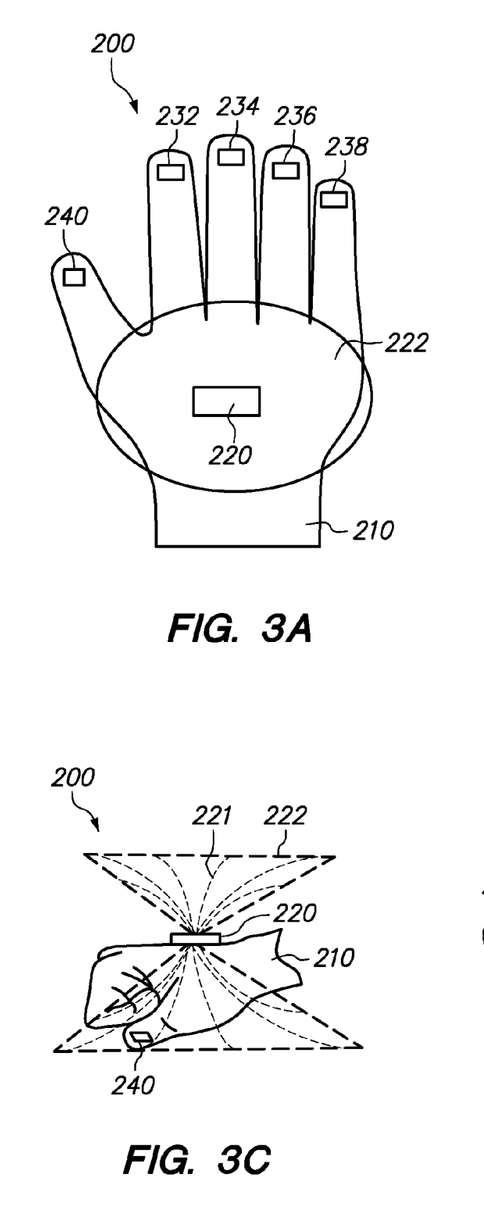
FIGS. 3A-3D show examples of gesture diagrams involving the RFID sensors and the electromagnetic field of an RFID reader, in accordance with the RFID System for Gesture Recognition, Information Coding, and Processing.
Figure 3B:
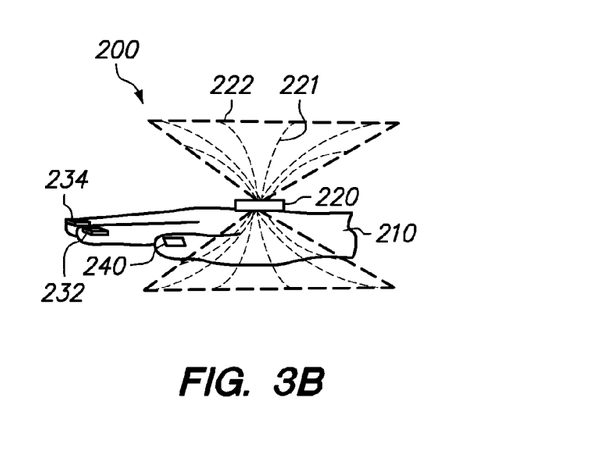
Figure 3D:
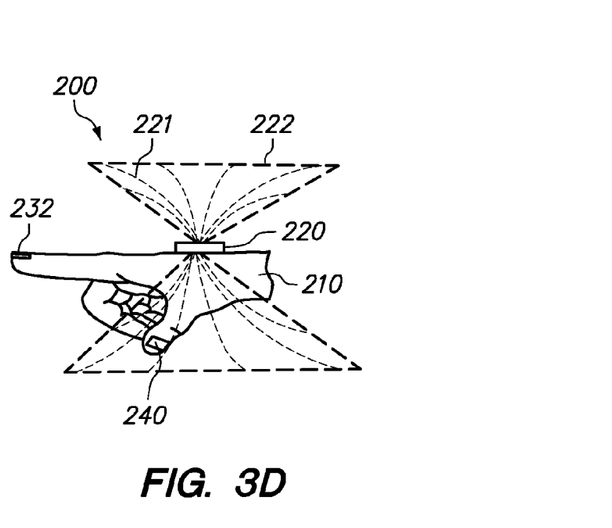

FIG. 2 shows a block diagram of an embodiment of an RFID sensor unit 100 in accordance with the RFID System for Gesture Recognition, Information Coding, and Processing. Sensor unit 100 may be incorporated into RFID sensor systems such as system 10 discussed with reference to FIG. 1. System 100 may include a controller 110, RFID sensor reader 120, RF transceiver 130, antenna 140, power supply 150, such as a battery, motion sensor 160, and orientation sensor 170. As an example, motion sensor 160 may be a three-axis accelerometer for providing linear and rotational motion information, and orientation sensor 170 may be a three-axis gyroscope to provide rotation motion information about the user's hand.

RFID sensor reader 120 is configured to transmit electromagnetic energy to create a detection region, such as detection region 222 of FIGS. 3A-3D. When an RFID sensor, such as RFID sensors 30, 32, 34, 36, and 38, enters the detection region, the RFID sensor receives energy transmitted from RFID sensor reader 120. The RFID sensor may then use that energy as a power source for its internal electronic and RF circuits.

The RFID sensors are configured to transmit an RFID sensor signal to RFID sensor reader 120 when the RFID sensor is within the detection region of RFID sensor reader 120. In some embodiments, the RFID sensor signal comprises encoded RFID data for a particular RFID sensor. RFID sensor reader 120 is then configured to transmit an RFID sensor reader signal to controller 110 after receiving the RFID sensor signal. In some embodiments, the RFID sensor reader signal comprises data about the location of the RFID sensor with respect to the detection region.

In some embodiments, controller 110 is configured to analyze the RFID sensor reader signal and determine particular hand gestures. Controller 110 may then transmit a signal to transceiver 130 after receiving the RFID sensor reader signal. The signal transmitted from controller 110 may include information about particular determined hand gestures. Transceiver 130 is then configured to transmit the signal to a remote processor via antenna 140. Examples of remote processors may include a computer, such as computer 350 shown in FIG. 5, or another wearable glove RFID system.

Power supply 150 supplies power for all electronic components of sensor unit 100. As an example, power supply 150 may be a rechargeable battery. In such embodiments, controller 110 may be configured to monitor and control the recharge process for battery 150. Controller 110 may also be configured to monitor the battery level and inform a user of a low battery level by means recognized by a person having ordinary skill in the art, such as a siren, chirp, flashing light, etc.

FIGS. 3A-3D and 4A-4D show examples of gesture diagrams 200 involving the RFID sensors and the electromagnetic field of an RFID reader, in accordance with the RFID System for Gesture Recognition, Information Coding, and Processing. As shown in FIG. 3A, an RFID sensor unit 220, such as sensor unit 100 of FIG. 2, is secured to a hand 210. It should be recognized that in some embodiments, sensor unit 220 may be secured to a hand by various means including by adhesive or a strap, while in other embodiments sensor unit 220 may be secured to hand 210 via a glove apparatus as shown in FIG. 1. Sensor unit 220 has a detection region 222, as shown by the circular region extending from sensor unit 220, formed by electromagnetic waves 221. RFID sensors 232, 234, 236, 238, and 240 are secured to hand 210 near the tips of the finger and thumb portions, and are wirelessly connected to sensor unit 220. In other embodiments, the RFID sensors are secured to other portions of the user's fingers. RFID sensors 232, 234, 236, 238, and 240 may be configured similarly to RFID sensors 30, 32, 34, 36, and 38 as shown in FIG. 1.

Figure 4A:
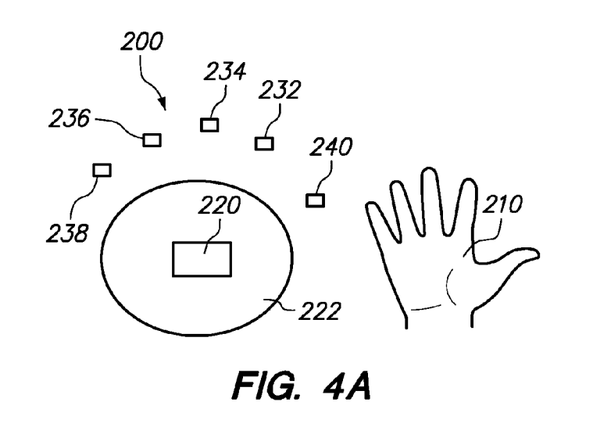
FIGS. 4A-4D show examples of hand gestures determined in accordance with the RFID System for Gesture Recognition, Information Coding, and Processing.
Figure 4B:
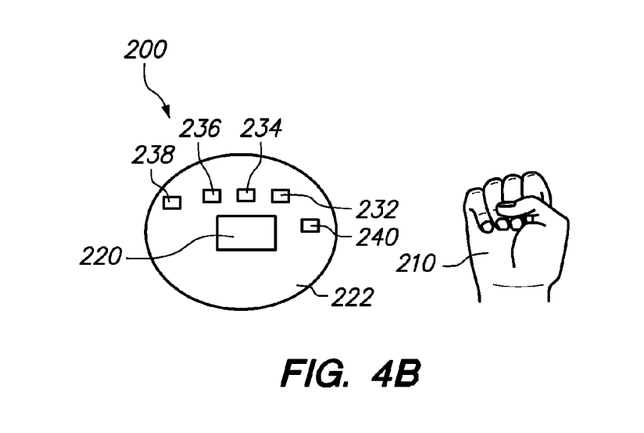

FIG. 3B illustrates a side view of a "stop" or "wait" gesture by hand 210, wherein each of RFID sensors 232, 234, 236, 238, and 240 are located outside of detection region 222. FIG. 4A illustrates a plan view of such gesture, including a diagram of RFID sensors 232, 234, 236, 238, and 240 with respect to detection region 222. FIG. 3C illustrates a side view of a "closed fist" gesture by hand 210, wherein each of RFID sensors 232, 234, 236, 238, and 240 are located within detection region 222. FIG. 4B illustrates a plan view of such gesture, including a diagram of RFID sensors 232, 234, 236, 238, and 240 with respect to detection region 222.

Figure 4C:
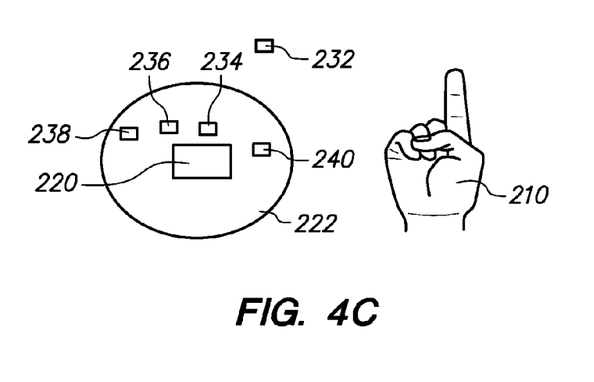
Figure 4D:
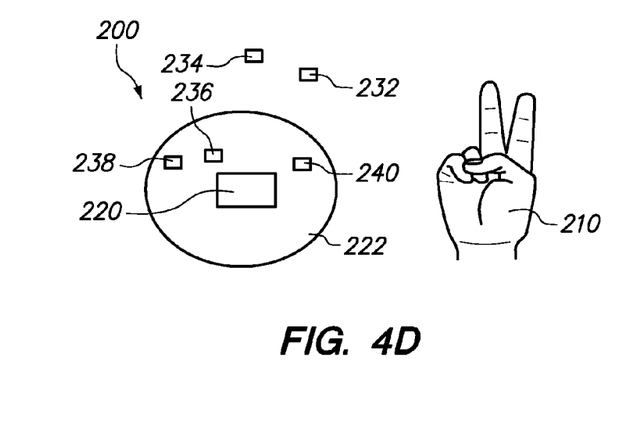

FIG. 3D illustrates a side view of a "number one" gesture by hand 210, wherein RFID sensors 234, 236, 238, and 240 are located within detection region 222, while RFID sensor 232 is located outside of detection region 222. FIG. 4C illustrates a plan view of such gesture, including a diagram of RFID sensors 232, 234, 236, 238, and 240 with respect to detection region 222. FIG. 4D illustrates a plan view of a "number two" gesture by hand 210, wherein RFID sensors 236, 238, and 240 are located within detection region 222, while RFID sensors 232 and 234 are located outside of detection region 222.

Figure 5:
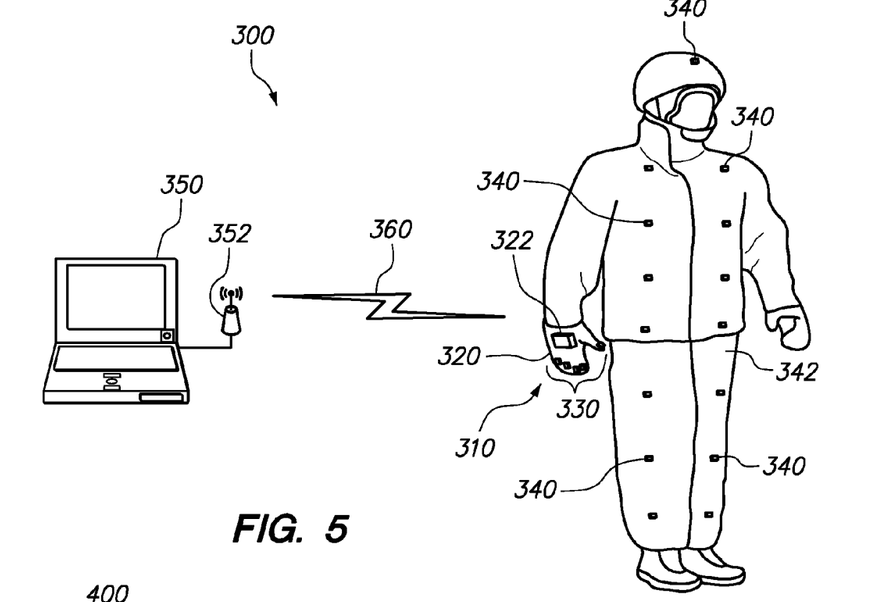
FIG. 5 shows an example of a wearable glove RFID system in communication with a remote processing device, in accordance with the RFID System for Gesture Recognition, Information Coding, and Processing.

FIG. 5 shows an example of a system 300 including a wearable glove RFID system 310 in communication with a remote processing device 350, in accordance with the RFID System for Gesture Recognition, Information Coding, and Processing. Wearable glove RFID system 310 may be configured similarly to wearable glove RFID system 10 shown in FIG. 1, having a glove 320 with an RFID sensor unit 322 and RFID sensors 330 located near the tips of the finger and thumb portions of glove 320. System 300 may also include RFID sensors 340 embedded within the uniform/clothing of a user 342 of RFID system 310. In some embodiments, sensors 340 may be uniformly distributed in an array-like pattern throughout the clothing of user 342. In other embodiments, sensors 340 may be located only in some clothing of user 342.

RFID sensor unit 322 may be configured similarly as RFID sensor unit 100 shown in FIG. 2. As such, RFID sensor unit 322 contains a RFID sensor reader that is configured to detect RFID sensors 330 or 340. Each of RFID sensors 340 uniquely represents a location on the user's uniform/clothing, allowing the RFID sensor reader and associated software to determine the relative location of the user's hand. As an example, the corresponding information about the user's hand location may be reported directly or may have semantics and be defined and interpreted as commands, messages, or gestures for communication and/or computer input/control. Such communication may occur via a transceiver within RFID sensor unit 322, which transmits signals over communication link 360 to an antenna 352 of a remote processing device 350. As an example, remote processing device may be a computer.

Figure 6:
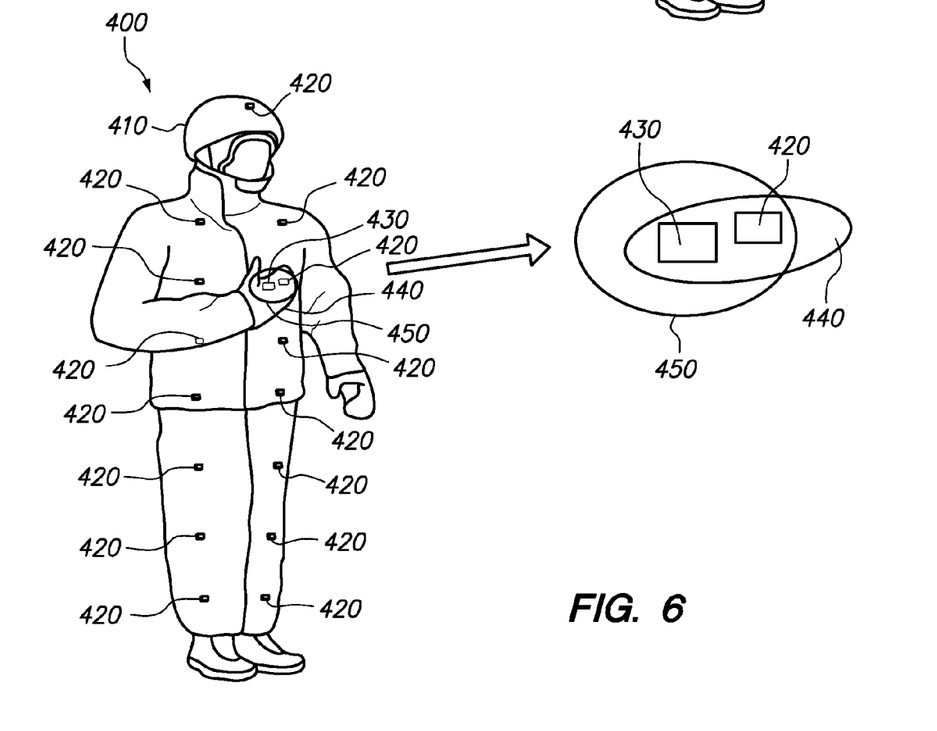
FIG. 6 shows a diagram illustrating the interaction of a hand-mounted RFID sensor unit with an RFID sensor embedded on a user, in accordance with the RFID System for Gesture Recognition, Information Coding, and Processing.

FIG. 6 shows a diagram 400 illustrating the interaction of a hand-mounted RFID sensor unit with an RFID sensor embedded on a user, in accordance with the RFID System for Gesture Recognition, Information Coding, and Processing. As shown, a plurality of RFID sensors 420 are distributed in an array-like pattern along the body of user 410. The hand 440 of user 410 contains an RFID sensor unit 430 secured thereto. As an example, RFID sensor unit 430 may be secured to hand 410 via a wearable glove as shown in FIG. 1. RFID sensor unit 430 may be configured similarly to RFID sensor unit 100 as shown in FIG. 2. As such, RFID sensor unit 430 may contain an RFID sensor reader having a detection region illustrated by the circular region 450 extending from RFID sensor 430.

User 410 may communicate information by placing RFID sensor unit 430 in close proximity to one of RFID sensors 420 such that the particular RFID sensor 420 is entirely within the detection region 450 of RFID sensor unit 430. In such a scenario, RFID sensor unit 430 will detect the presence of sensor 420, and proceed to process the information in accordance with a method such as method 700 as discussed with reference to FIG. 9. In some embodiments however, RFID sensor unit 430 may be configured to detect the presence of a sensor 420 if sensor 420 is partially within detection region 450. In some embodiments, user 410 may communicate information by placing RFID sensor unit 430 in close proximity to an RFID sensor located on another individual.

Figure 7:
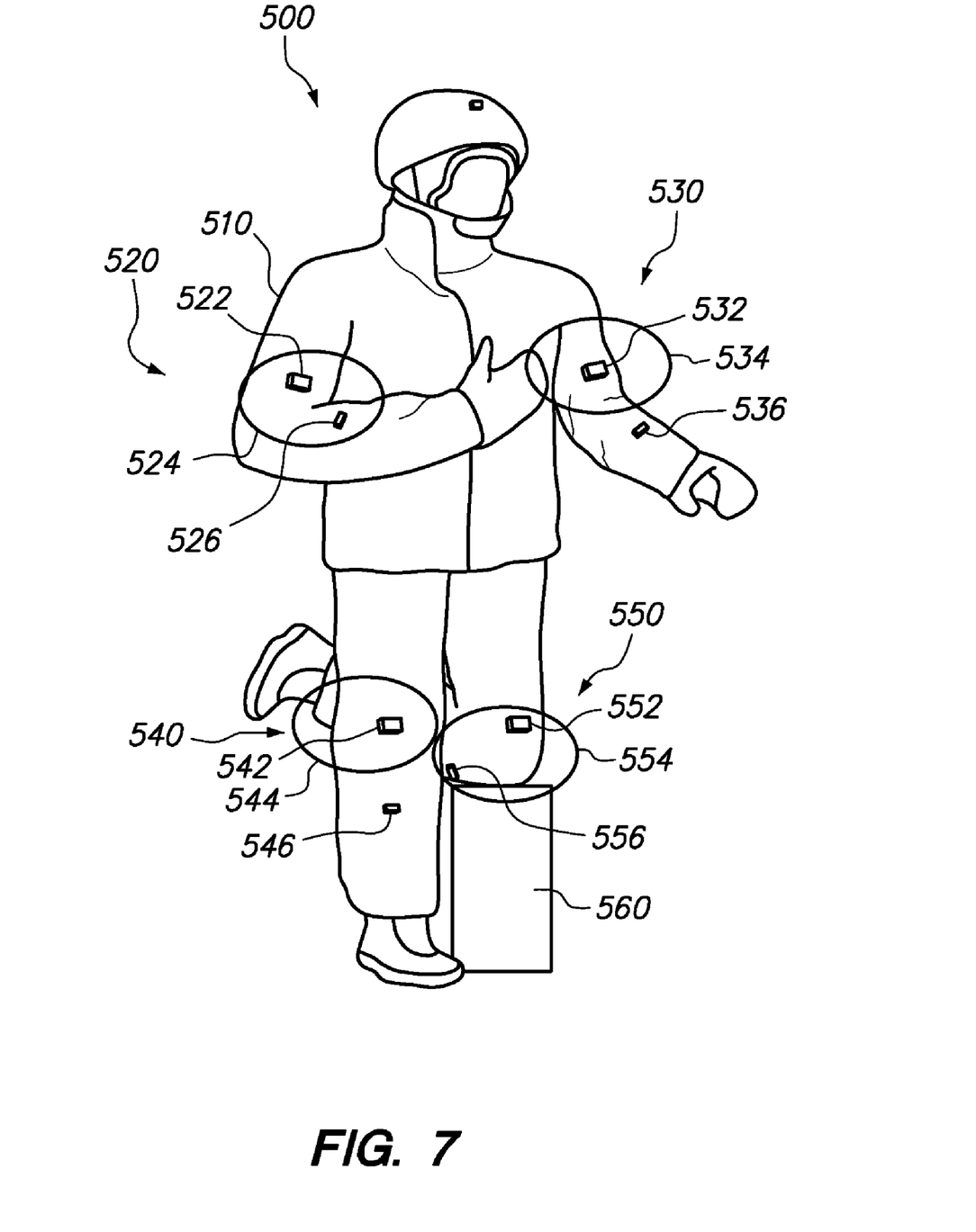
FIG. 7 shows a diagram of multiple RFID systems located on various parts of a user's body, in accordance with the RFID System for Gesture Recognition, Information Coding, and Processing.

FIG. 7 shows a diagram of multiple RFID systems located on various parts of a user's body, in accordance with the RFID System for Gesture Recognition, Information Coding, and Processing. A user 510 may have multiple sensor systems distributed at various locations of a user's body. As shown, a user 510 may have a first sensor system 520, a second sensor system 530, a third sensor system 540, and a fourth sensor system 550. However, it should be recognized that a user may have more or less sensor systems, and in other locations, than as shown.

First sensor system 520 may include a first RFID sensor unit 522 having a detection region 524, and a first RFID sensor 526. First RFID sensor unit 522 may be secured to the upper right arm of user 510, while first RFID sensor 526 may be secured to the upper forearm of user 510. Such a configuration allows user 510 to communicate by bending the right elbow such that first sensor 526 is partially or fully encompassed by detection region 524.

Second sensor system 530 may include a second RFID sensor unit 532 having a detection region 534, and a second RFID sensor 536. Second RFID sensor unit 532 may be secured to the upper left arm of user 510, while second RFID sensor 536 may be secured to the upper left forearm of user 510. Such a configuration allows user 510 to communicate by bending the left elbow such that second RFID sensor 536 is partially or fully encompassed by detection region 534.

Third sensor system 540 may include a third RFID sensor unit 542 having a detection region 544, and a third RFID sensor 546. Third RFID sensor unit 542 may be secured to the upper right leg of user 510, while third RFID sensor 546 may be secured to the upper right calf of user 510. Such a configuration allows user 510 to communicate by bending the right knee such that third RFID sensor 546 is partially or fully encompassed by detection region 544.

Fourth sensor system 550 may include a fourth RFID sensor unit 552 having a detection region 554, and a fourth RFID sensor 556. Fourth RFID sensor unit 552 may be secured to the upper left leg of user 510, while fourth RFID sensor 556 may be secured to the upper left calf of user 510. As shown in the figure, user 510 may communicate by bending the right knee such that third RFID sensor 546 is partially or fully encompassed by detection region 544. Such communication may occur by user 510 performing an act such as kneeling on the ground or on an object 560.

Figure 8:
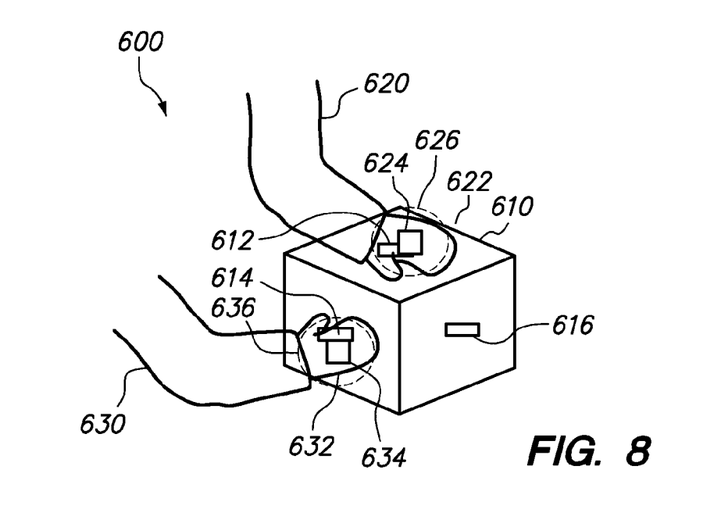
FIG. 8 shows a diagram illustrating the interaction of a hand-mounted RFID sensor unit with RFID sensors embedded within an object, in accordance with the RFID System for Gesture Recognition, Information Coding, and Processing.

FIG. 8 shows a diagram 600 illustrating the interaction of a hand-mounted RFID sensor unit with RFID sensors embedded within an object 610, in accordance with the RFID System for Gesture Recognition, Information Coding, and Processing. A user, represented by arms 620 and 630, may have a first RFID sensor unit 624 secured to a left hand 622 and a second RFID sensor unit 634 secured to a right hand 632. First RFID sensor unit 624 may have a detection region 626 and second RFID sensor unit 634 may have a detection region 636. Object 610 may include multiple RFID sensors, such as sensors 612, 614, and 616 embedded in various locations therein. Examples of object 610 may include fixed-location equipment, mobile equipment, and weapons that may be activated or authenticated by RFID reader activation. In some embodiments, object 610 may include one or more RFID readers.

A user may communicate information by grasping object 610 such that one or both of detection regions 626 and 636 are overlapping one or two sensors. Benefits to this type of communication include the ability to generate a wide range of commands, words, messages, signals, semaphores, or gestures, by interacting with an object that may, on appearance, have no resemblance to a communication device.

Figure 9:
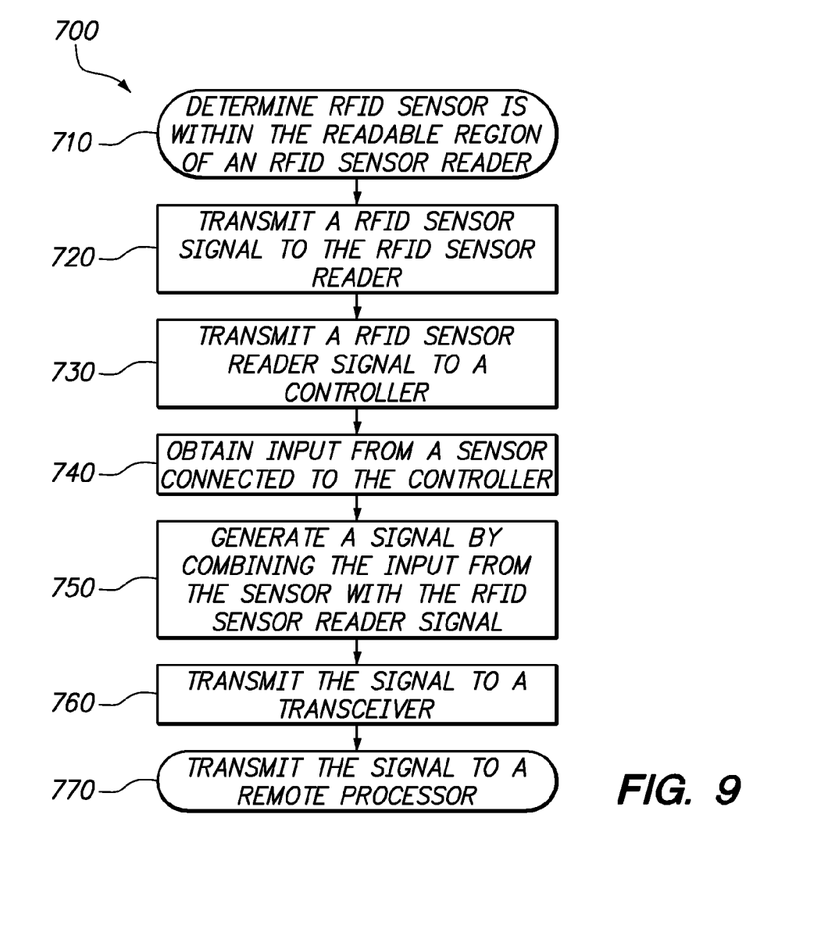
FIG. 9 shows a flowchart of an embodiment of a method for use in accordance with the RFID System for Gesture Recognition, Information Coding, and Processing.

FIG. 9 shows a flowchart of an embodiment of a method 700 for use in accordance with the RFID System for Gesture Recognition, Information Coding, and Processing. Method 700 may be performed by an RFID system such as any of the systems discussed herein. For illustrative purposes, method 700 will be discussed with reference to system 10 of FIG. 1 having RFID sensor unit 100, as shown in FIG. 2, incorporated therein.

Method 700 may begin at step 710, which involves determining that an RFID sensor 30, 32, 34, 36, and/or 38, are within a detection region 50 of an RFID sensor reader 120. Step 710 may be performed by logic within micro-controller 110. Next, step 720 involves transmitting a RFID sensor signal to RFID sensor reader 120. Step 720 may be performed by micro-controller 110. In some embodiments, the RFID sensor signal comprises encoded RFID data for a particular RFID sensor. Method 700 may then continue to step 730, which involves transmitting an RFID sensor reader signal to micro-controller 110 after receiving the RFID sensor signal. In some embodiments, the RFID sensor reader signal comprises data about the location of RFID sensor 30, 32, 34, 36, and/or 38 with respect to detection region 50. Step 730 may be performed by logic stored within RFID sensor reader 120.

In some embodiments, method 700 continues directly to step 760. In other embodiments, method 700 continues to step 740, which involves obtaining input from a sensor connected to micro-controller 110. As an example, input may be obtained from motion sensor 160 and/or orientation sensor 170. Step 740 may be performed by micro-controller 110. Next, step 750 may involve generating a signal by combining the input from the sensor with the RFID sensor reader signal. Step 740 may be performed by micro-controller 110. Method 700 may then continue to step 760, where the signal is transmitter to transceiver 130. In embodiments wherein method 700 proceeds from step 730 directly to step 760, the signal does not contain input from a sensor connected to micro-controller 110. Next, step 770 involves transmitting the signal to a remote processor via antenna 140. An example of such a remote processor is computer 350 as shown in FIG. 5.

Some or all of the steps of method 700 may be stored on a computer readable storage medium, wherein the steps are represented by computer readable programming code. The steps of method 700 may also be implemented using a programmable device, such as a computer-based system. Method 700 may comprise instructions that, when loaded into a computer-based system, cause the system to execute the steps of method 700. Method 700 may be implemented using various programming languages, such as "C" or "C++".

Various storage media, such as magnetic computer disks, optical disks, and electronic memories, as well as computer readable media and computer program products, can be prepared that can contain information that can direct a device, such as a micro-controller, to implement the above-described systems and/or methods. Once an appropriate device has access to the information and programs contained on the storage media, the storage media can provide the information and programs to the device, enabling the device to perform the above-described systems and/or methods.

For example, if a computer disk containing appropriate materials, such as a source file, an object file, or an executable file, were provided to a computer, the computer could receive the information, appropriately configure itself and perform the functions of the various systems and methods outlined in the diagrams and flowcharts above to implement the various functions. That is, the computer could receive various portions of information from the disk relating to different elements of the above-described systems and/or methods, implement the individual systems and/or methods, and coordinate the functions of the individual systems and/or methods.

Many modifications and variations of the RFID System for Gesture Recognition, Information Coding, and Processing are possible in light of the above description. Within the scope of the appended claims, the RFID System for Gesture Recognition, Information Coding, and Processing may be practiced otherwise than as specifically described. Further, the scope of the claims is not limited to the implementations and embodiments disclosed herein, but extends to other implementations and embodiments as may be contemplated by those having ordinary skill in the art.

We claim:

1. A system comprising:
   a wearable glove having a palm portion and a plurality of finger portions;
   an RFID sensor reader, coupled to the wearable glove, having a detection region;
   plurality of RFID sensors, wherein each RFID sensor is coupled to the wearable glove near the tip of each finger portion and each tag is moveable between a position outside the detection region and a position inside the detection region;
   a controller, coupled to the wearable glove and connected to the RFID sensor reader, wirelessly connected to each RFID sensor via the RFID sensor reader; and
   a transceiver, coupled to the wearable glove, connected to the controller
   wherein the controller is configured to determine a hand gesture by a user of the wearable glove for communication by the transceiver based on a particular pattern of whether each of the respective RFID sensors is located within the detection region and to transmit a signal corresponding to the determined hand gesture.

2. The system of claim 1 further comprising:
   a motion sensor connected to the controller; and
   an orientation sensor connected to the controller
   wherein the controller receives sensor signals from at least one of the motion sensor and the orientation sensor.

3. The system of claim 2, wherein the motion sensor is an accelerometer and the orientation sensor is a gyroscope.

4. The system of claim 2, wherein the RFID sensor reader is configured to transmit an RFID sensor reader signal to the controller after receiving an RFID sensor signal from one or more of the RFID sensors, wherein the controller determines the hand gesture based upon the received RFID sensor signals and the received RFID sensor reader signal.

5. The system of claim 4, wherein the controller is configured to transmit the signal corresponding to the determined hand gesture to the transceiver after receiving the received RFID sensor signals and the received RFID sensor reader signal.

6. The system of claim 5, wherein the transceiver is configured to transmit the signal corresponding to the determined hand gesture to a remote processor.

* * * * *